United States Patent [19]

Osborn et al.

[11] 3,794,922

[45] Feb. 26, 1974

[54] DATA SAMPLING COMMUNICATION SYSTEM

[75] Inventors: William Osborn, Dallas; Bob Carter, Euless, both of Tex.

[73] Assignee: Tocom, Inc., Irving, Tex.

[22] Filed: Jan. 26, 1972

[21] Appl. No.: 220,988

[52] U.S. Cl. .......... 325/53, 178/DIG. 13, 179/2 AS, 325/31

[51] Int. Cl. .......................... H04b 1/00, H04b 7/00

[58] Field of Search ........... 325/51, 53, 55, 31, 308; 178/5.1, DIG. 9, 13; 179/2 AS; 235/52; 340/202, 357

[56] References Cited

UNITED STATES PATENTS

| | | | |
|---|---|---|---|
| 3,668,307 | 6/1972 | Face et al. | 178/DIG. 13 |
| 3,058,065 | 10/1962 | Freeman et al. | 325/31 |

OTHER PUBLICATIONS

I.E.E.E Spectrum–Applications Report–Ronald K. Jurgen, Managing Editor November 1971, Pages 39–54, "Two–Way Applications For Cable Television Systems in the '70's".

*Primary Examiner*—Benedict V. Safourek
*Assistant Examiner*—Marc E. Bookbinder
*Attorney, Agent, or Firm*—Clegg and Cantrell

[57] ABSTRACT

Disclosed is a system for sampling or interrogating selected ones of a plurality of remote units at which are located television receivers, to determine which of a plurality of television channels are being viewed at the interrogated remote units at the particular time of interrogation. The system includes a master station which transmits interrogation signals simultaneously to a plurality of remote units. Each remote unit includes a data transducer mechanism and a transmitter mechanism for transmitting reply signals back to the master station. The data transducer is coupled to the television receiver channel selector and is responsive thereto for generating data signals representing the particular channel being viewed at any given instant. Each remote unit also includes a data readout mechanism responsive to readout signals transmitted from the master station for producing a digital data signal representative of the data signal generated by the data transducer and supplying same to the transmitter mechanism. The disclosed system is especially adapted for use in a community antenna or cable television system in which each remote unit is coupled to the cable system.

9 Claims, 12 Drawing Figures

CONTROL SIGNAL FORMAT

| INTERVAL | FUNCTION | EXTERNAL SIGNALS | INTERNAL SIGNALS |
|---|---|---|---|
| I | MASTER RESET PULSE | $f_1$ $\bar{f}_2$ $\bar{f}_3$ | |
| II | WORD COUNT PULSE | $f_1$ $f_2$ $\bar{f}_3$ | |
| III | I D CLOCK PULSES | $f_1$ $f_3$ | I D ARM |
| III | I D "ONE" SIGNAL | $f_2$ $f_3$ | I D ARM |
| III | I D "ZERO" SIGNAL | $\bar{f}_2$ $f_3$ | I D ARM |
| IV | WORD COUNT PULSES | $f_1$ $f_2$ $\bar{f}_3$ | |
| V | DATA READOUT CLOCK | $f_1$ $f_2$ $f_3$ | $\overline{\text{ID ARM}}$ |

FIG. 3

WORD AND BIT FORMAT

READOUT BIT NUMBER

| WORD NO. | 1 | 2 | 3 | 4 | 5 | 6 | 7 | 8 | 9 | 10 | 11 | 12 | 13 | 14 | 15 | 16 | FUNCTION |
|---|---|---|---|---|---|---|---|---|---|---|---|---|---|---|---|---|---|
| 1 | F | A | P | on off | yes | no | no op | X | A | B | C | D | E | Pay | X | Monitor | ALARM, OPINION, RATING, MONITOR |
| 2 | X | X | X | X | X | X | X | X | X | X | X | X | X | X | X | X | SPARE |
| 3 | X | X | X | X | X | X | X | X | X | X | X | X | X | X | X | X | SPARE |
| 4 | 1 | 2 | 4 | 8 | 1 | 2 | 4 | 8 | 1 | 2 | 4 | 8 | 1 | 2 | 4 | 8 | WATER METER (BCD) |
| 5 | 1 | 2 | 4 | 8 | 1 | 2 | 4 | 8 | 1 | 2 | 4 | 8 | 1 | 2 | 4 | 8 | GAS METER (BCD) |
| 6 | 1 | 2 | 4 | 8 | 1 | 2 | 4 | 8 | 1 | 2 | 4 | 8 | 1 | 2 | 4 | 8 | ELECTRIC METER (BCD) |
| 7 | 1 | 2 | 4 | 8 | 1 | 2 | 4 | 8 | 1 | 2 | 4 | 8 | 1 | 2 | 4 | 8 | OTHER DATA (BCD) |
| 8 | NONE | | | | | | | | | | | | | | | | RESET OPINION FFs |
| 9 | TEST SIGNALS | | | | | | | | | | | | | | | | SINGLE OSC OFF |
| 10 | TEST SIGNALS | | | | | | | | | | | | | | | | SINGLE OSC ON |
| 11 | TEST SIGNALS | | | | | | | | | | | | | | | | ALL OSC OFF |
| 12 | TEST SIGNALS | | | | | | | | | | | | | | | | ALL OSC ON |

FIG. 4

DATA SAMPLING COMMUNICATION SYSTEM

BACKGROUND OF THE INVENTION

This invention relates to digital-type data communications systems and, while not limited thereto, is particularly useful in connection with a community antenna or cable television signal distribution system.

In cable television systems, the television program signals are distributed to the various subscribers by way of a coaxial cable. While such systems generally perform in a satisfactory manner, it would be desirable to employ the same coaxial cable for transmitting various information and data signals to and from the subscriber's location to the central station or master station from which the television signals are transmitted. The signals transmitted back to the central station might include, for example, fire alarm signals, burglar alarm signals, ambulance summoning signals, water meter, gas meter and electric meter reading signals, viewer response signals, and the like. A system for transmitting such signals is disclosed in a co-pending application of William F. Osborn, Ser. No. 220984. Such a bi-directional cable system would also be useful in determining which of a plurality of channels were being viewed at various remote units at a given time. Further, such a system could be used in connection with pay television for monitoring the usage of television by the subscriber and transmitting appropriate billing data signals to an automatic data processor located at the central station.

It is an object of the invention, therefore, to provide a new and improved communications system for enabling a master station to selectively interrogate different ones of a large number of remote units at which television receivers are located to transmit data signals back to the master station indicating which of a plurality of television channels are being viewed at the remote units at the time of interrogation.

It is also an object of the invention to provide such a system in which data signals are transmitted from selected remote units to the master station indicating whether such remote units are authorized pay television customers.

It is a further object of the invention to provide such a communications system which is particularly useful in connection with a cable television (CATV) system for enabling bi-directional flow of information between the central programming station and the various remote subscriber units.

For a better understanding of the present invention, together with other and further objects and features thereof, reference is made to the following description taken in connection with the accompanying drawings.

BRIEF DESCRIPTION OF THE DRAWINGS

Referring to the drawings:

FIGS. 3 and 4 are charts used in explaining the operation of the FIG. 2 remote unit;

DESCRIPTION OF THE ILLUSTRATED EMBODIMENT

Figure 1:
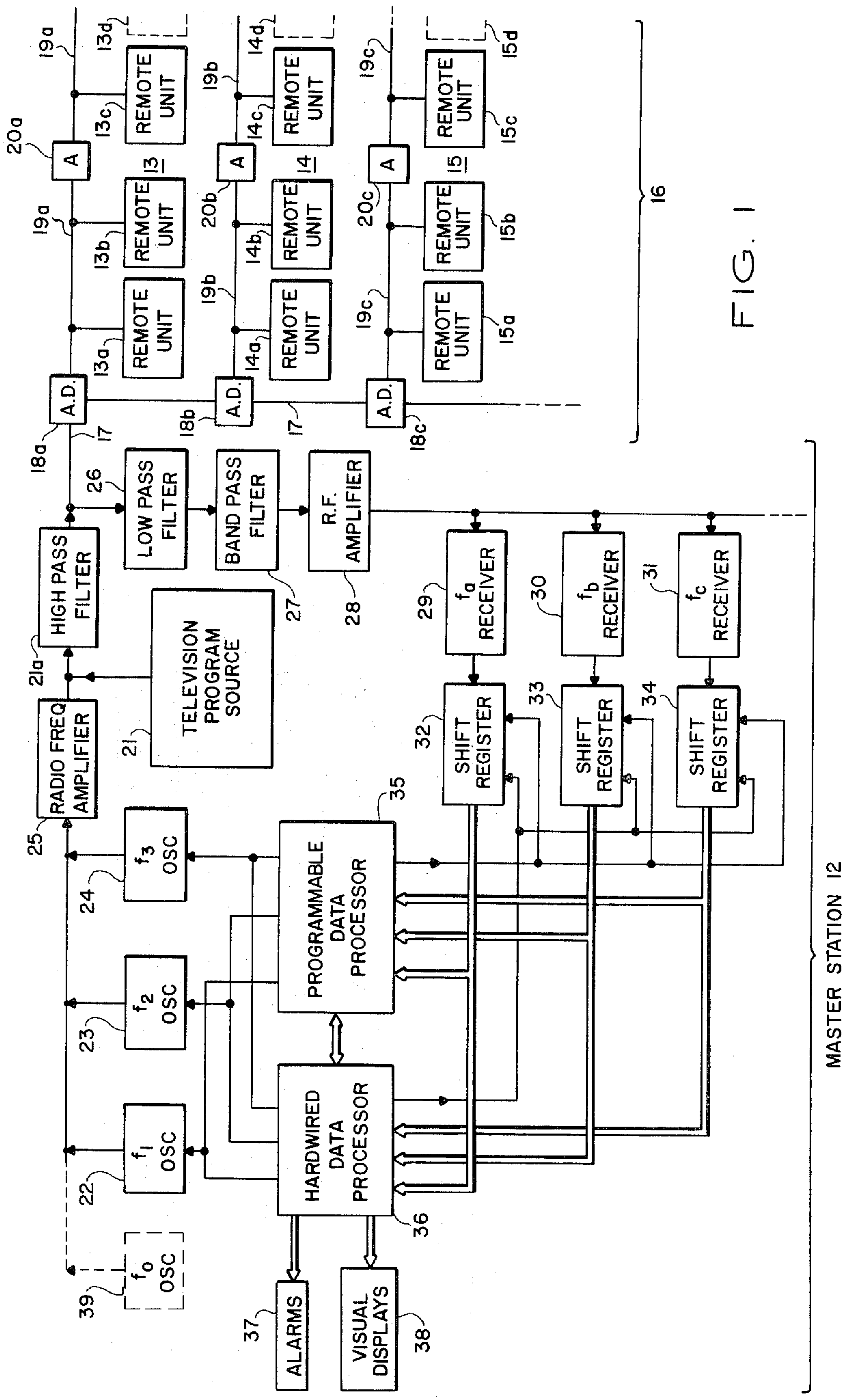
FIG. 1 is an overall system block diagram of a representative embodiment of the present invention as applied to the case of a cable television system and, as such, shows the general features of the master programming station and the connection of typical ones of the remote subscriber units to the cable distribution system.

Referring to FIG. 1, there is shown a master station 12 connected to a number of remote subscriber units 13*a*, 13*b*, 13*c*, etc., 14*a*, 14*b*, 14*c*, etc., 15*a*, 15*b*, 15*c*, etc., by way of a coaxial cable network or signal distribution system indicated generally at 16. Cable distribution system 16 includes a coaxial type trunk cable 17 having various bi-directional trunk amplifier and distribution units 18*a*, 18*b*, 18*c*, etc., connected at spaced points therealong. Coaxial type feeder cables 19*a*, 19*b*, 19*c*, etc., extend outwardly from respective ones of the amplifier and distribution units 18*a*, 18*b*, 18*c*, etc. Remote units in group 13 (13*a*, 13*b*, 13*c*, etc.) are connected to feeder cable 19*a*, while remote units in group 14 are connected to feeder cable 19*b* and remote units in group 15 are connected to feeder cable 19*c*. Various bi-directional amplifiers 20*a*, 20*b*, 20*c*, etc., are located at spaced points along feeder cables 19*a*, 19*b*, 19*c*, etc., respectively.

As will be seen, each remote unit includes a television receiver, a television signal converter and a data transmission system. The data transmitters in the remote units in group 13 are constructed to transmit data back to the master station 12 by means of a radio-frequency signal at a first frequency of, for example, 10 megahertz. The data transmitters in the group 14 remote units employ a radio-frequency signal at a second frequency of, for example, 12 megahertz, while the data transmitters in the group 15 remote units employ a radio-frequency signal at a third frequency of, for example, 14 megahertz. Additional remote unit groups would employ radio-frequency signals at additional frequencies in, for example, the five to 30 megahertz range. The system is constructed so that each remote unit group, for example, group 13 connected to feeder cable 19*a*, can include as many as 999 individual remote units, there being as many bi-directional amplifiers 20*a* spaced along cable 19*a* as are necessary to maintain the desired signal strength and quality.

The master station 12 includes a television program source of transmitter 21 for transmitting television signals for the desired number of television channels (e.g., 36 channels) by way of a high-pass filter 21*a* and the coaxial cable distribution system 16 to each of the various remote subscriber units connected thereto. Such television signals may fall within, for example, a 50 to 300 megahertz frequency range. The master station 12 further includes interrogation signal transmitter circuits for interrogating the remote units, data receiving circuits for receiving reply signals from the remote unit and data processing equipment for controlling the transmitting circuits and receiving circuits and processing the reply data received by the latter. The interrogation signal transmitter circuits include a set of three oscillator circuits 22, 23 and 24 for simultaneously generating radio-frequency signals at three different frequencies designated as $f_1$, $f_2$ and $f_3$. Frequencies $f_1$, $f_2$ and $f_3$ may be, for example, 41, 45 and 48 megahertz, respectively. The interrogation signals are applied by way of a radio-frequency amplifier 25 and the high-pass filter 21*a* to the cable distribution system 16. Amplifier 25 should be capable of handling frequencies in the 40 to 50 megahertz range, while high-pass filter 21*a* should be capable of passing signals of 40 megahertz and higher.

The three frequencies could alternatively be generated by transmitting a carrier signal $f_0$ (generated by oscillator circuit 39) of, for example, 50 megahertz along with modulated signals $f_1$, $f_2$ and $f_3$ (generated respectively by oscillator circuits 22, 23 and 24) of, for example, 50.445, 50.700 and 50.800 megahertz respectively. In this case, of course, the amplifier 25 would have to be capable of handling the four frequencies in question.

The data signal receiving portion of the master station 12 includes a low-pass filter 26, a band-pass filter 27 and a radio-frequency amplifier 28. Filters 26 and 27 are constructed so as to pass through to the amplifier 28 only frequencies falling within the frequency band used by the data transmitters in the different remote units. As such, low-pass amplifier 26 may be constructed to pass, for example, frequencies of 30 megahertz and less, while band-pass filter 27 is constructed to pass frequencies in the five to 30 megahertz frequency range. The output signals appearing at the output of radio-frequency amplifier 28 are supplied to the inputs of radio receivers 29, 30 and 31. Receiver 29 is tuned to a frequency $f_a$ corresponding to the frequency for the remote unit data transmitters connected, for example, to feeder cable 19*a* (e.g., 10 megahertz). Receiver 30 is tuned to a frequency $f_b$ corresponding to the frequency of the remote unit data transmitters connected, for example, to feeder cable 19*b* (e.g., 12 megahertz). Receiver 31 is tuned to a frequency $f_c$ corresponding to the frequency of the remote unit data transmitters connected, for example, to feeder cable 19*c* (e.g., 14 megahertz).

The detected signals appearing at the outputs of receivers 29, 30 and 31 are in the form of serial digital data signals and are shifted into shift registers 32, 33 and 34, respectively, in a serial manner. The data signals stored in shift registers 32, 33 and 34 are periodically transferred in a parallel manner to both a programmable data processor 35 (such as an Interdata Model 70) and a hardwired data processor 36. Data processors 35 and 36 control the readin and readout operations of the shift registers 32, 33 and 34. Data processors 35 and 36 also function as modulator mechanisms for controlling or modulating the operation of interrogation signal oscillators 22, 23 and 24 in a manner which is coordinated or synchronized with the operation of the shift registers 32, 33 and 34. More particularly, data processors 35 and 36 serve to selectively enable and disable each of the oscillators 22, 23 and 24 so as to turn on and turn off the radio-frequency interrogation signals therefrom in a digital manner. Alarms 37 and visual displays 38 are connected to the hardwired data processor 36 for advising a human operator stationed at the master station 12 of various conditions that may occur in different ones of the remote units. Programmable data processor 35 may be programmed to provide automatic billing for utility companies, automatic tabulation of television viewer program ratings and the like.

Figure 2:
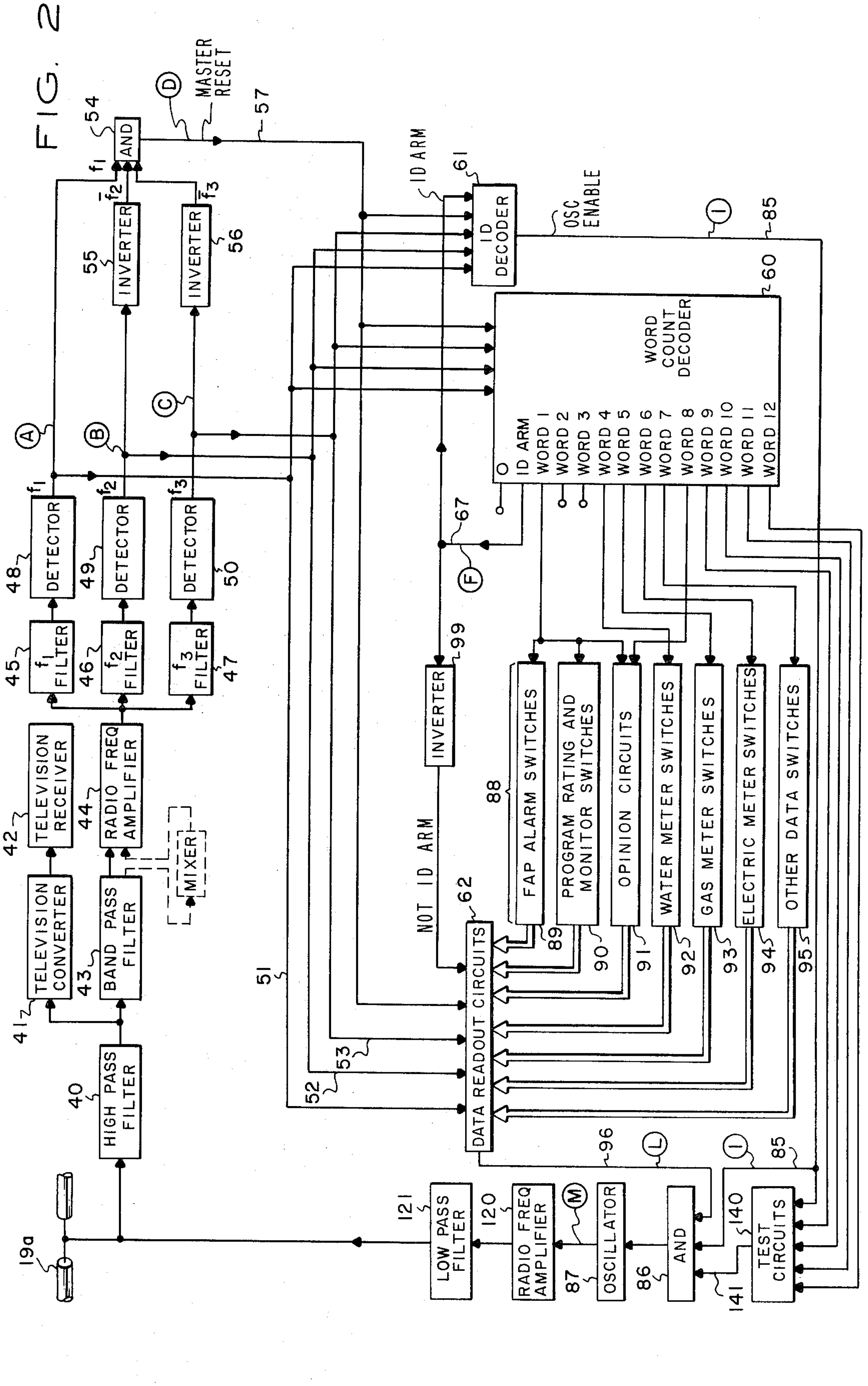
FIG. 2 is a general block diagram showing in greater detail the construction of an individual one of the remote subscriber units of FIG. 1.

Referring now to FIG. 2, there is shown a more detailed block diagram for an individual one of the remote units of FIG. 1. For sake of an example, it will be assumed that the remote unit shown in FIG. 2 is the remote unit 13*a* of FIG. 1. Television program signals transmitted by the television transmitter 21 of FIG. 1 are taken from the coaxial feeder cable 19*a* and supplied by way of a high-pass filter 40 and a television signal converter 41 to a television receiver 42. Television receiver 42 produces television pictures and sound in the usual manner. Television converter 41 includes a channel selector mechanism for selecting the television channel to be viewed and converts the transmitted channel carriers to the appropriate frequencies required by the television receiver 42. As such, converter 41 may be constructed to handle signals in, for example, the 50 to 300 megahertz range. High-pass filter 40 is constructed to pass frequencies of 40 megahertz and higher. Television converters are well-known in the prior art, one such example being the Selectronics' Gamut 26 converter.

Television program source or transmitter 21, cable distribution system 16 (of FIG. 1), television converter 41 and television receiver 42 (of FIG. 2) constitute the conventional parts of a community antenna television (CATV) system. The remainder of FIG. 2 is not conventional and, as such, constitutes the data transmitter and control function portion of the remote unit 13*a*. And, of course, this portion may be utilized independently of the program source 21, television converter 41 and television receiver 42.

The data transmitter function portion of FIG. 2 includes a band-pass filter 43 and a radio-frequency amplifier 44 connected to cascade with the high-pass filter 40. The output of amplifier 44 is connected to frequency selective detector means responsive to the received master station interrogation signals for producing control signals in accordance with the modulation thereof. More particularly, the output of amplifier 44 is connected to the inputs of three individual filters 45, 46 and 47, the outputs of which are connected to respective ones of detectors 48, 49 and 50. Filter 45 is sharply tuned to the same frequency $f_1$, as is the interrogation signal oscillator 22 at the master station 12, such frequency being, for example, 41 megahertz. Filter 46 is sharply tuned to the same frequency $f_2$ as is the second interrogation signal oscillator 23 at the master station 12, such frequency being, for example, 45 megahertz. Filter 47 is sharply tuned to the same frequency $f_3$ as is the third oscillator 24 in the master station 12, such frequency being, for example, 48 megahertz. Thus, the detected control signals appearing at the outputs of detectors 48, 49 and 50 correspond to the binary signals used to modulate the master station oscillators 22, 23 and 24, respectively. Portions of typical waveforms for these detected $f_1$, $f_2$ and $f_3$ signals are represented by waveforms A, B and C, respectively, of FIG. 5. These detected $f_1$, $f_2$ and $f_3$ control signals are supplied by way of bus lines 51, 52 and 53, respectively, to various circuits to be considered hereinafter.

If the alternative scheme for generating the frequencies $f_1$, $f_2$ and $f_3$ were utilized, i.e. generating a carrier frequency $f_0$ along with three modulating frequencies $f_1$, $f_2$ and $f_3$, then a mixer circuit would be connected in cascade between the band-pass filter 43 and radio-frequency amplifier 44 to generate the difference frequencies $f_1$–$f_0$, $f_2$–$f_0$, and $f_3$–$f_0$. The filters 45, 46 and 47 would then be tuned each to a different one of these difference frequencies.

The code format for the $f_1$, $f_2$ and $f_3$ interrogation signals is indicated in the chart of FIG. 3. As there indicated, the first function of these control signals is to generate a master reset pulse. This pulse is generated during interval I of each of the successive frame periods (see FIG. 5). This is accomplished by supplying the $f_1$ signal directly to the first input of an AND circuit 54 and by supplying the $f_2$ and $f_3$ signals by way of inverters 55 and 56, respectively, to second and third inputs of the AND circuit 54. As indicated in the chart of FIG. 3, a master reset pulse is generated whenever $f_1$ is present and $f_2$ and $f_3$ are not present. The waveform for the master reset pulse train is represented by waveform D of FIG. 5, such master reset pulses being supplied by way of bus line 57 to the various units to be considered hereinafter.

Figure 5:
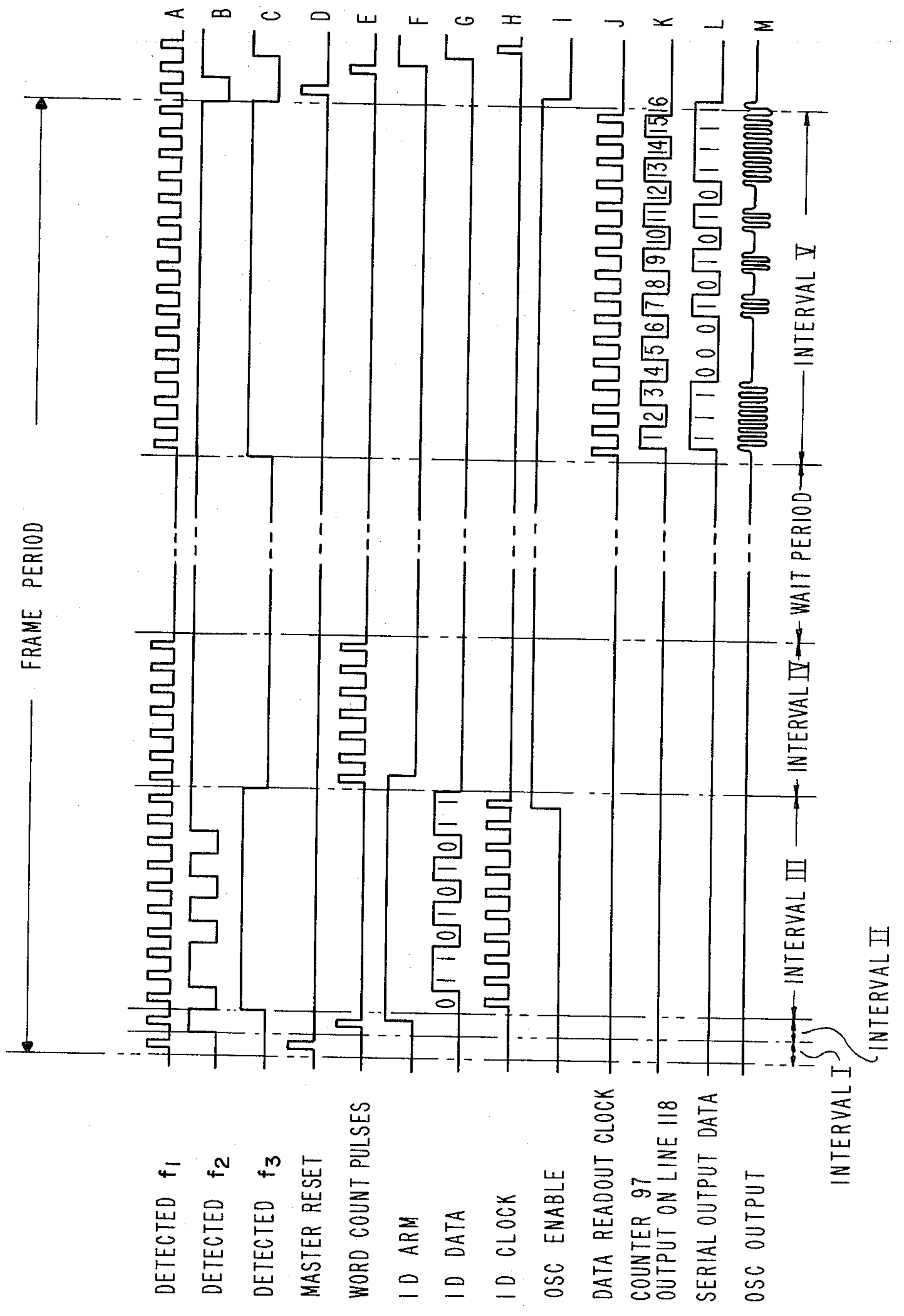
FIG. 5 is a timing diagram showing portions of typical signal waveforms developed at different points in the FIG. 2 remote unit.

Referring now to FIG. 5, it is there intended to be represented that the parallel interrogation signals $f_1$, $f_2$ and $f_3$ transmitted by the master station 12 are coded so as to provide a continuous procession of successive frame periods, one such frame period being shown in FIG. 5. As further indicated in FIG. 5, each frame period can, for convenience, be thought of as being subdivided into five time intervals designated as I, II, III, IV and V. As will be better appreciated hereinafter, the $f_1$ interrogation signal is in the nature of a continuous train of clock pulses (except for a wait period during which $f_1$ is not transmitted). By way of example only, the pulse rate of the detected $f_1$ pulses may be one megahertz or higher in which case the time spacing between leading edges of neighboring pulses in one microsecond or less. The time spacing shown in FIG. 5 is 40 microseconds per bit for the data transmitted or generated in intervals I through IV and 320 microseconds per bit for the data transmitted in interval VIII. The reason for the change in data rate in interval VII concerns the possible wide variation in distances of the remote units from the master station and will be discussed later.

The master reset pulse (waveform D) is generated during interval I. This resets a pulse counter in a function selector or word count decoder 60, a shift register in an identification (I.D.) decoder 61, and a pulse counter in data readout circuits 62.

During interval II, the $f_1$, $f_2$ and $f_3$ signals act to generate a single word count pulse (waveform E) which serves to advance the function selector or word count decoder 60 to an "ID arm" condition. This can be better seen by reference to FIG. 6 which shows the word count decoder 60 in greater detail. As there is shown, decoder 60 includes a four-bit binary pulse counter 63 which drives a four-line to 16-line decoder 64 (only 14 output lines of which are shown). When counter 63 is reset, the zero output line of decoder 64 is activated. The first count thereafter activates the "ID arm" line, the second count thereafter activates the "one" output line, the third count activates the "word one" output line, etc., only one output line at a time being activated. The word count pulses (waveform E) which drive the counter 63 are derived by means of logic circuit means represented by AND circuit 65 and inverter circuit 66. A word count pulse appears at the output of AND circuit 65 whenever $f_1$ and $f_2$ are present and $f_3$ is not present. In terms of the waveforms of FIG. 5, a signal is considered to be present when the waveform is at the binary one level (higher level) and not present when the waveform is at the binary zero level (the lower level).

Figure 6:
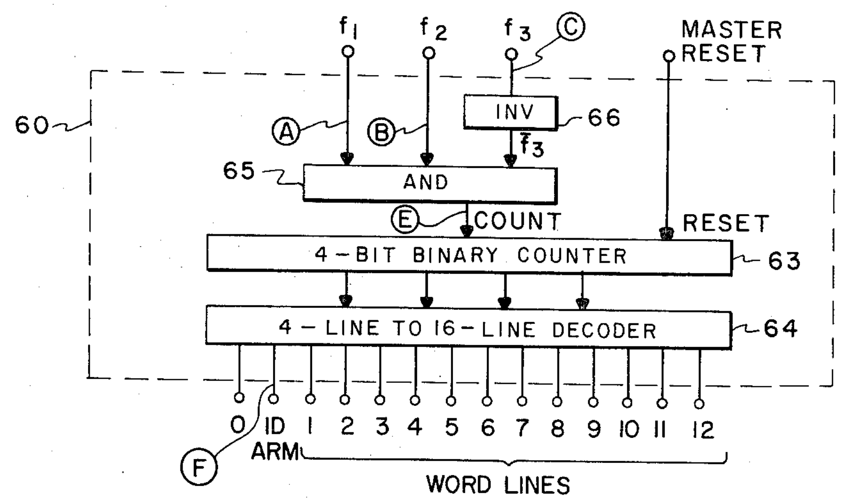
FIG. 6 is a more detailed block diagram of a function selector decoder used in the FIG. 2 remote unit.

It will be seen by referring back to FIG. 2, that the "ID arm" signal appearing on the "ID arm" output line of counter 64 of FIG. 6 is supplied by way of conductor 67 to the I.D. decoder 61 for purposes of arming the input gates to the shift register therein. The waveform for the "ID arm" signal is represented by waveform F in FIG. 5.

Interval III of the frame period depicted in FIG. 5 is used for purposes of transmitting a 10-bit identification code signal to the remote units. Each remote unit in any given feeder cable group (e.g., group 13 connected to feeder cable 19*a*) has a unique identification number. If the transmitted I.D. number matches the remote unit ID number, then the reply transmitter in that particular remote unit is activated. Otherwise, it remains disabled. Thus, the I.D. code enables the interrogation of a selected one of the remote units connected to the same feeder cable. Note, in passing and with reference to FIG. 1, that a given I.D. number may not only activate a remote unit in group 13 but also at the same time one of the remote units in group 14 and one of the remote units in group 15. The simultaneous reply signals in such case are maintained separated because the remote unit transmitters on the different feeder cables 19*a*, 19*b* and 19*c* are operating at different frequencies, which frequencies are selectively and separately processed by the different receivers 29, 30 and 31 at the master station 12.

Figure 7:
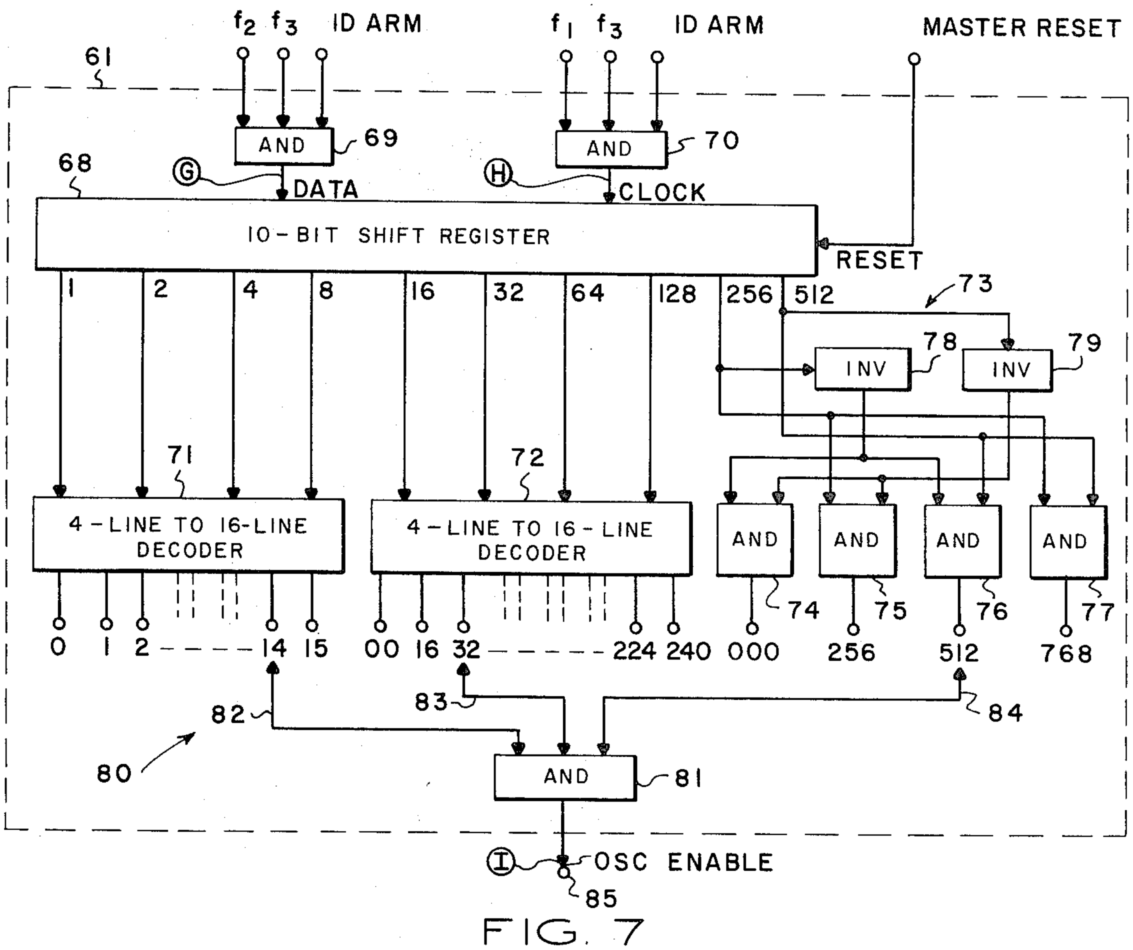
FIG. 7 is a more detailed block diagram of an identification decoder unit used in the FIG. 2 remote unit.

Referring now to FIG. 7, there is shown in greater detail the construction of the ID decoder 61 of FIG. 2. As seen in FIG. 7, the ID decoder 61 includes a 10-bit shift register 68 which is initially cleared or reset to zero by the master reset pulse. Data is read into the shift register 68 in a serial manner by way of AND circuit 69. Clock pulses for clocking in the serial data are provided by means of an AND circuit 70. Logic circuits 69 and 70 are activated to supply data pulses and clock pulses to the shift register 68 only when the "ID arm" signal is at the binary one level (word count decoder 60 in "ID arm" position). With reference to the FIG. 3 chart, it is seen that AND circuit 70 produces an output clock pulse whenever the $f_1$ and $f_3$ signals (also "ID arm" signal) are at the binary one level. AND circuit 69, on the other hand, produces a binary one level output only when the $f_2$ and $f_3$ signals (also "ID arm" signal) are at the binary one level. Since the $f_3$ signal is always at the binary one level during interval III, the $f_1$ signal pulses can be thought of as clock pulses and the $f_2$ signals can be thought of as the ID data signals.

The 1, 2, 4 and 8 binary output lines from shift register 68 are connected to a four-line to 16-line decoder 71, the 16, 32, 64 and 128 binary output lines of shift register 68 are connected to a second four-line to 16-line decoder 72 and the 256 and 512 binary output lines of shift register 68 are connected to a two-line to four-line decoder indicated generally at 73. The 16 output lines from decoder 71 represent decimal values from zero through 15 in increments of one. Only one of these output lines will be activated at the binary one level at any given instant. The 16 output lines from decoder 72 represent decimal values in the range of zero to 240 in increments of 16. Only one of the output lines of decoder 72 will be activated at the binary one level at any given instant. Decoder 73 includes AND circuits 74, 85, 76 and 77 and inverter circuits 78 and 79. The logic is such that the output lines of AND circuits 74–77 represent decimal values in the range of zero to 768 as obtained by counting by increments of 256. The output line of only one of the AND circuits 74–77 will be at the binary one level at any given instant.

ID decoder 61 is provided with the patchboard type interconnection set-up, indicated generally at 80, such that any selected one of the output lines of decoder 71 can be connected to a first input of an AND circuit 81, any selected one of the output lines of decoder 72 can be connected to a second input of the AND circuit 81 and any selected one of the output lines of AND circuit 74–77 can be connected to a third input of the AND circuit 81. These three connections are made by way of conductors 82, 83 and 84, respectively. The resulting decimal value represented by the occurrence of a binary one level at the output of AND circuit 81 is obtained by summing up the decimal values for the three input lines to the AND circuit 81. For the example shown in FIG. 7, a binary one level appears at the output of AND circuit 81 when the decimal value is 558 (14 + 32 + 512). Thus, the number 558 is the ID number for the particular remote unit using the particular patchboard connections shown in FIG. 7. As is apparent, the highest ID number which can be used with the specifid set-up shown in 1023. Thus 1023 remote units could be accommodated on each of the feeder cables 19*a*, 19*b*, 19*c*, etc., of FIG. 1 though, for convenience, the actual number of remote units is limited to 999. Also, the system can be expanded to handle a larger number of remote units on the same feeder cable by increasing the size of the shift register 68 and the number or capacity of the decoders 71, 72, and 73.

Assume, for sake of example, that it was decided in advance that the ID decoder 61 of FIG. 7 should recognize the ID code number of 558 and the question was how to connect the connector leads 82–84. This is determined by connecting the lead 84 to the highest output of the decoder 73 which is less than the desired number. This gives the 512 output. The number 512 is then subtracted from the desired ID number, resulting in a difference of 46. The connector lead 83 is then connected to the largest number value output of decoder 72 which is less than the previous difference of 46. This gives the output lead 32 for decoder 72. This decoder 72 value of 32 is then subtracted from the previous difference value of 46 to give a remainder of 14. The remaining connector lead 82 is then connected to the number value line of decoder 71 which is equal to this final remainder, in this case the number value 14 output line.

Referring to FIG. 2, it is seen that the "oscillator enable" signal (waveform I of FIG. 5) produced at the output of AND circuit 81 of ID decoder 61 is supplied by way of conductor 85 to an AND circuit 86 which controls a remote unit reply signal transmitter or oscillator 87. Note in passing that oscillator 87 is turned on whenever all three input lines to the AND circuit 86 are AT the binary one level. Otherwise, oscillator 87 is turned off. at Referring to FIG. 5, it is seen that in the next frame period interval, namely, interval IV, there are produced a selectable number of word count pulses (waveform E) which are used to advance the pulse counter 63 and decoder 64 in word count decoder 60 to the desired word count condition (FIG. 6). In other words, the occurrence of one word count pulse during interval IV activates the "word one" output line of decoder 60, the occurrence of two word count pulses during interval IV activates the "word two" output line of decoder 60, the occurrence of three word count pulses during interval IV activates the "word three" output line of decoder 60, etc. It is understood, of course, that only one of the output lines of word count decoder 60 is activated (placed at binary one level) at any given instant. The number of word count pulses which are produced during interval IV is determined by the length of time during that interval that the detected $f_3$ signal (output of detector 50 of FIG. 2) is at the binary zero level.

Referring to FIG. 2, it is seen that the word count output lines of decoder 60 are used to control the status of different ones of a group of data transducer mechanisms indicated generally at 88. These data transducer mechanisms 88 include F.A.P. (fire-ambulance-police) alarm switches 89, program rating and monitor switches 90, opinion circuits 91, water meter switches 92, gas meter switches 93, electric meter switches 94 and other data switches 95. The object in the present example is to enable a readout of the data from possibly one or more sets of the switches 89–95 during any given interrogation signal frame period. The switch set from which the readout data is obtained is determined by the particular one of the word output lines of the word count decoder 60 which is activated during the particular frame period in question. Thus, by properly selecting the number of word count pulses transmitted during interval IV of a particular frame period, a particular one or more of these switch sets 89–95 is selected for readout purposes. Assume, for sake of example, that it is desired to obtain a water meter reading during the particular frame period in question. In this case, four word count pulses (waveform E) are generated from received waveforms $f_1, f_2$ and $f_3$ during interval IV for purposes of enabling readout of the data condition of the water meter switches 92. The condition of the water meter switches 92 are then sampled during the next frame sub-interval, namely, interval V, by the data readout circuit 62 to produce a serial type digital signal (waveform L of FIG. 5) which is supplied to AND circuit 86 for controlling the oscillator 87 in accordance therewith. Thus, the number of word count pulses during interval IV serves the function of an address code or function selector code for selecting the particular data transducer mechanism which is to be sampled.

Following interval IV and preceding interval V is a predetermined wait period during which no operations at the remote units take place. This wait period is to allow time for the enabling signals (outputs from word count decoder 60) to reach and enable the transducer mechanisms before commencing the data readout interval V. By allowing a wait period of, for example, 240 microseconds, enablement of all transducer mechanisms, even those located some distance from the enabling circuitry of the remote unit, should be completed before the readout interval V begins.

Figure 8:
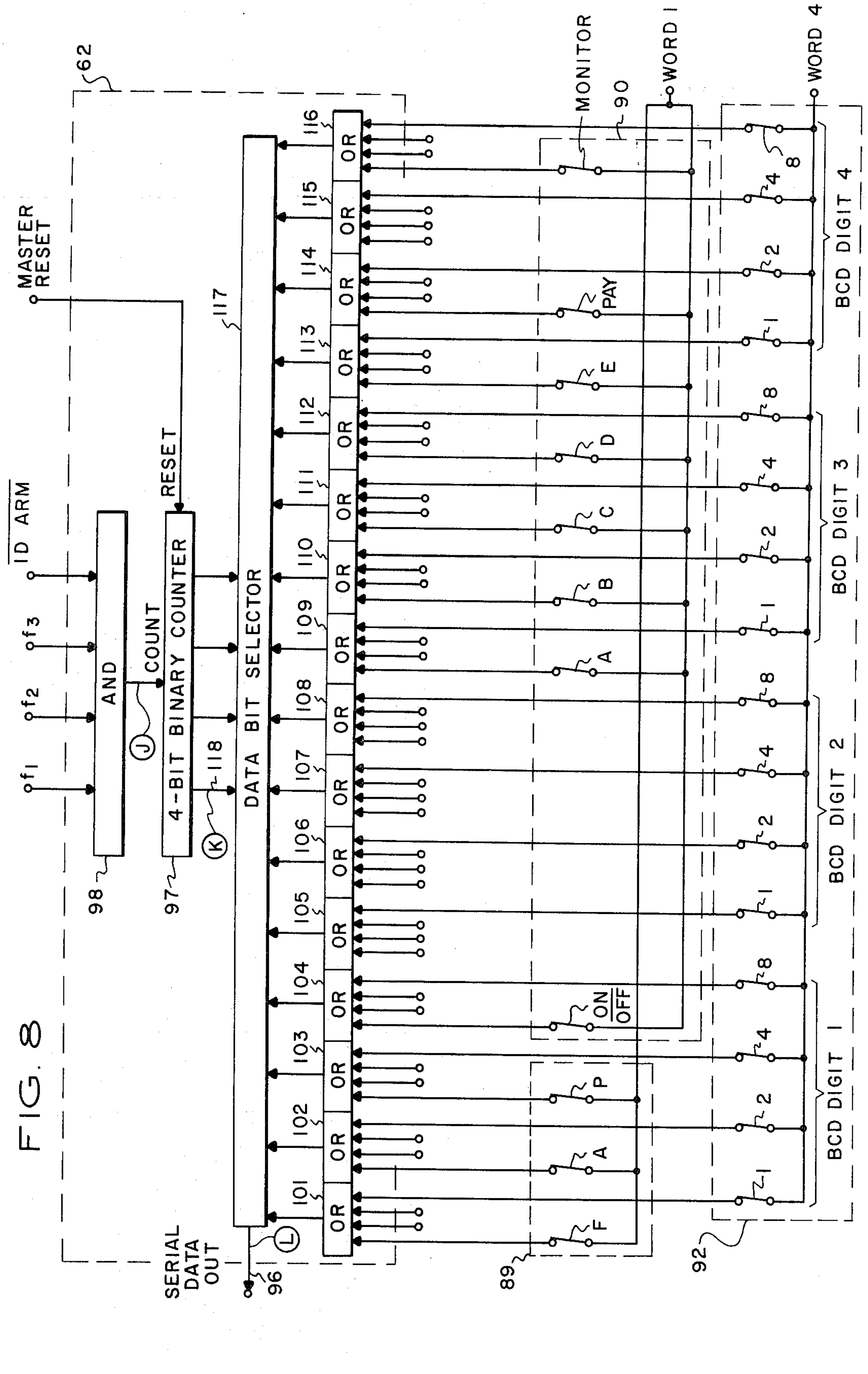
FIG. 8 shows in greater detail the construction of certain data readout circuits and typical ones of various data transducer mechanisms used in the FIG. 2 remote unit.

Referring now to FIG. 8, there is shown in greater detail the construction of the data readout circuits 62 which are operative during interval V for purposes of generating the data reply signal which is sent back to the master station 12. There is also shown in greater detail in FIG. 8 the construction of the alarm switches 89, the program rating and monitor switches 90 and the water meter switches 92 of FIG. 2, the details of the other switches being omitted for sake of simplicity. The output signal from data readout circuits 62 (on conductor 96) is a serial 16–bit binary signal. Readout is accomplished by supplying a series of 16 data readout clock pulses (waveform J of FIG. 5) to the counting input of a four-bit binary counter 97. These readout clock pulses are obtained by means of an AND type logic circuit 98, to the four inputs of which are respectively applied the $f_1$, $f_2$, $f_3$ and "not ID arm" signals. The "not ID arm" signal is obtained from an inverter 99 (FIG. 2), the input of which is connected to the "ID arm" output of the word count decoder 60. Thus, the "not ID arm" input of AND circuit 98 is at the binary one level whenever the word count decoder 60 is at any position other than the "ID arm" position. Since the $f_2$ and $f_3$ signals remain continuously at the binary one level during interval V, AND circuit 98, in effect, passes 16 of the $f_1$ clock pulses to the counter 97.

The readout bit format for the different words is set forth in the chart of FIG. 4. Assume, for example, that a "word one" readout is selected. As seen from either FIG. 2 or FIG. 8, this means that the alarm switches 89, the program rating and monitor switches 90 and the opinion circuits 91 will be enabled for readout purposes by the binary one level signal on the word one output line of word count decoder 60, the remainder of the switch sets 92–95 remaining disabled. The three switches in set 89 and the eight switches in set 90 are individually connected to different ones of a set of 16 OR circuits 101–116. The binary coding in the present example is such that the closure of a switch in either of the sets 89 or 90 represents a binary one condition, while the open condition represents a binary zero condition. Thus, in effect, a series of binary ones and zeros appear at the outputs of OR circuits 101–116 in accordance with the open and closed conditions of the individual switches in sets 89 and 90.

The outputs of OR circuits 101–116 are sampled one at a time in a sequential manner by a data bit selector 117. Selector 117 is controlled by the pulse counter 97. The output signal appearing on output line 118 of pulse counter 97 is represented by waveform K of FIG. 5. This signal alone does not tell which of the OR gates 101–116 is being sampled at any given instant, but does define the basic sampling intervals, these being indicated by the numerals 1, 2, 3, 4, etc., on waveform K. In this regard, it is noted that the counter 97 counts on the trailing edges of the readout clock pulses (waveform J) supplied to the input thereof. Data bit selector 117 is comprised of 16 sets of multiple input AND circuits each having their outputs connected to the common selector output line 96. One input of each AND circuit in selector 117 is connected to the output of one of the OR gates 101–116, while the other inputs of each AND circuit are connected to the appropriate ones of the output lines of counter 97 in accordance with the particular bit interval during which it is to be activated.

A more or less typical representation of the serial binary output signal from readout circuits 62 (on output line 96) is represented by waveform L in FIG. 5. This serial data signal is supplied by way of AND circuit 86 (FIG. 2) to the oscillator 87 to turn same on when the data signal is at the binary one level and to turn same off when the data signal is at the binary zero level, it being assumed that the other two inputs to the AND circuit 86 are at the binary one level at this time. The corresponding output signal of oscillator 87 is represented by waveform M of FIG. 5. For sake of reliable reception and detection at the master station 12, a minimum of approximately 10 cycles of oscillation should be produced by oscillator 87 during each readout bit interval during which it is turned on. The frequency of oscillation may be, for example, 21250 kilohertz. The output of oscillator 87 is supplied by way of a radio-frequency amplifier 120 and a low-pass filter 121 to the coaxial feeder cable *19a* for transmission back to the master station 12. At the master station 12, this serial data signal of $f_a$ frequency bursts is detected by receiver 29 and the detected data signal is read into the shift register 32 and thereafter transferred to the data processors 35 and 36 for the desired data processing. The low-pass filter 121 in FIG. 2 is constructed to pass frequencies of, for example, 30 megahertz or less.

At this point, the reason for providing a transmission rate for interval V which is different from that for intervals I through IV will be discussed. It is apparent that for a given communication system, some remote units may be located a very short distance from the master station whereas other remote units may be located at rather long distances from the master station. Because of this, the time lapse for sending interrogation signals to the remote units and for receiving reply data therefrom will vary depending upon the distance of the particular remote unit in question from the master station. Since the master station does not "know" the distance of a remote unit from which it is receiving reply data, it is necessary that the master station be able to sample the received reply data in a manner which accounts for variations in round trip transmission times. This is done by providing a longer time duration of data bits in the data readout interval V (e.g. 320 microseconds per bit) so that the reply data will likewise have the same longer time duration of its data bits. Then sampling the readout data at the master station may be done at some time after the longest expected round trip delay but within a period equal to the shortest expected round trip delay plus the time duration of a reply data bit. For example, if the longest expected round trip delay from the sending of interrogation signals to the receipt of reply data were 440 microseconds and the shortest were 340 microseconds, then for a bit duration time of 320 microseconds, sampling of reply data at the master station could begin 550 microseconds after sending out the interrogation signals with the assurance that the sampling would be done as the first bit of the received reply data was being received, i.e. that the sampling was properly synchronized. If the shortest delay time were encountered, the leading edge of the first bit of the reply data could be received 340 microseconds after the sending of the interrogation signals so that the sample would occur 110 microseconds before receipt of the trailing edge of this bit and thus at the proper time. If, on the other hand, the longest delay time were encountered, the leading edge of the first bit of the reply data would be received 440 microseconds after the sending of the interrogation signals so that the sampling would occur 210 microseconds before receipt of the trailing edge of this bit and thus again at the proper time.

Figure 9A:
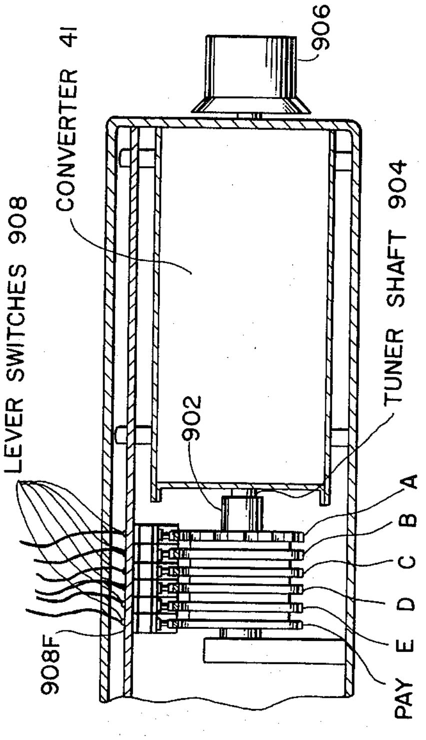
FIGS. 9A through 9C show mechanical switch mechanisms for generating television channel information signals.
Figure 9B:
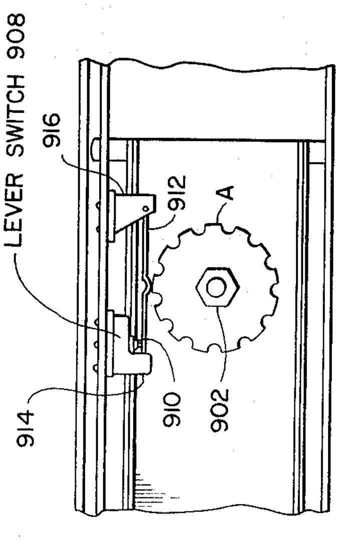
Figure 9C:
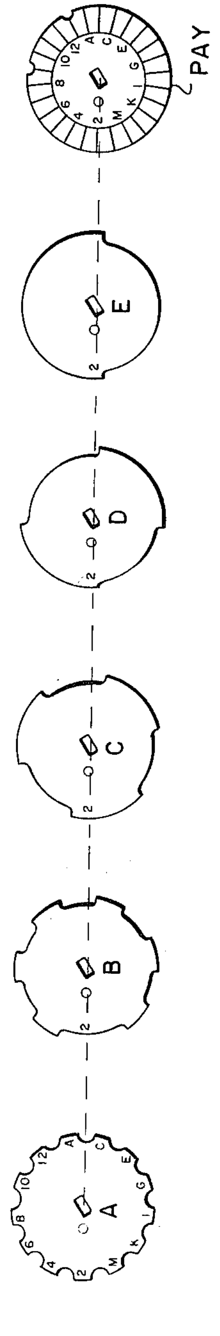

Referring now to the FIG. 4 chart, it is seen that the alarm switches 89, the program rating and monitor switches 90 and the opinion circuits 91 are sampled during a "word one" interrogation of the remote unit. The alarm switches 89 and opinion circuits 91 are discussed in detail in the aforecited Osborn application. The "on/off" switch in switch set 90 is ganged to the master on/off switch for the converter 41 and advises the master station of the on/off status of the remote unit television receiver. The program rating switches A-E represent switches responsive to the setting of the channel selector of the converter 41 for indicating to which channel the television receiver 42 is tuned. One such illustrative switch arrangement is shown in FIGS. 9A through 9C and will be discussed later. In general, however, each setting of the channel selector, whether of the pushbutton or rotary type, causes a different combination of the program rating switches A-E to close. Thus, by sampling the program rating switches, it can be determined at the master station 12 which television channel is being watched at any given instant.

It should be noted that if the present invention were utilized with other than a CATV system and converter 41 or similar unit were not required, the "on/off" switch in switch set 90 would be ganged to the on/off switch of the television receiver (rather than of the converter) and the program rating A-E would represent switches responsive to the setting of the channel selector of the television receiver (rather than of the channel selector of the converter). This should be kept in mind throughout the remainder of the description.

It is, of course, possible to provide a separate program rating switch for each channel selector position (rather than encoding each channel selector position into a five-bit code), but this would generally require more hardware (switches) and the use of additional "word number" bit positions. For example, if there were 36 channel selector positions, then 36 separate program rating switches would be required as well as the use of 36 "word number" bit positions—such as all the bit positions of word 2 and word 3 (presently unused—see FIG. 4) as well as four-bit positions of word 1.

Figure 10:
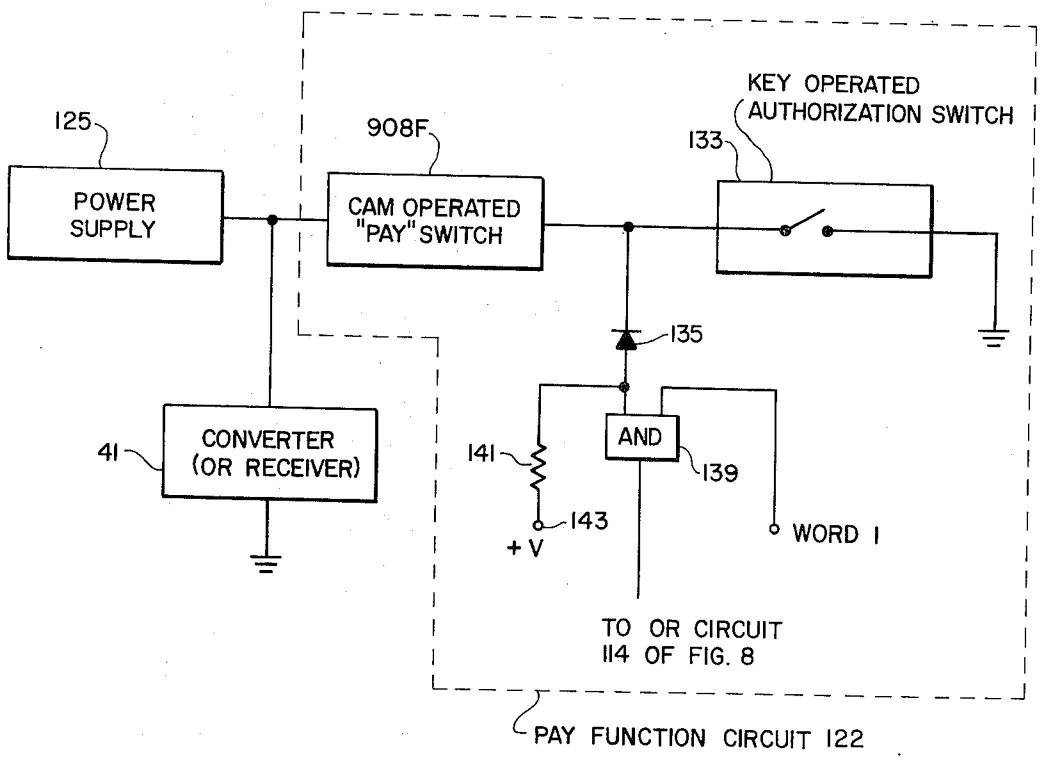
FIG. 10 shows a pay television function circuit.

The "Pay" switch in switch set 90 represents a switch or circuit for indicating whether the remote unit user is an authorized "pay" television customer, e.g. for purposes of determining whether the user is to be billed for the time the television receiver is tuned to a "Pay T.V." channel. An illustrative circuit for providing such indication is shown in FIG. 10 and will be discussed later.

The "monitor" switch in switch set 90 is set to the closed position manually when the remote unit user becomes a user of the system. This provides a simple check of whether the interrogation process of that remote unit is being carried out properly. For example, if the program rating switches 90 were sampled by the master station and a binary zero signal were present in bit position 16 of the serial output signal, the master station would be apprised that a trouble condition existed at the remote unit.

The *x*'s used in one of the "word one" bit positions and all of the "word two" and "word three" bit positions (FIG. 4) represent spare or unused bit intervals.

The water meter switches 92 of FIG. 8, are discussed in the aforecited copending application and thus will not be considered here. Similarly, the opinion circuits 91, test circuits 140, and other transducer mechanisms 88 are discussed in said copending application and will not be further discussed here.

FIGS. 9A through 9C show an exemplary shaft encoder for generating readout data identifying to which channel a particular television receiver is tuned and whether that channel is a "pay T.V." channel. FIG. 9A shows a side elevational view of the shaft encoder which includes six cams labeled A through E and "Pay" secured on a shaft 902 which is mechanically coupled to the tuner shaft 904 of the converter 41. Of course, as the tuner shaft 904 is rotated by rotating a channel selector knob 906, the cams A through E and "Pay" are also rotated. Six lever switches 908 are each positioned near the perimeter of a different one of the cams A through "Pay" and are operable by the corresponding cam. Each of the lever switches 908 include a plunger 910 (as best seen in FIG. 9B), a leaf spring 912 extending between casings 914 and 916 and positioned above a corresponding cam and in contact with the plunger 910. The central portion of the leaf spring 912 is formed into a semicircular arch extending downwardly and slidably engaging the perimeter of a corresponding cam. One end of the leaf spring is pivotally secured in the casing 916 and the other end of the spring is movably secured in casing 914 such that if a force is applied upwardly to the center of the spring, the plunger 910 of the switch is depressed thereby opening the switch.

As can best be seen in FIG. 9C, each of the cams A through E includes a plurality of notches spaced about the perimeter thereof, the length of the notches varying from one cam to the next. Thus, cam A has thirteen notches evenly spaced about its perimeter, each notch corresponding to a different one of the tuner shafts 904 positions (i.e. channels) and each portion of the cam perimeter between the notches corresponding to a different tuner shaft 904 position. Cam B includes six notches spaced about its perimeter, five of which each correspond to two tuner shaft 904 positions and the sixth of which corresponds to three tuner shaft 904 positions. The portion of the cam perimeter of cam B between the notches each correspond to two tuner shaft 904 positions. Cams C, D and E have still fewer, but longer notches spaced about their perimeters.

The "Pay" cam provides an indication of which of the channels are "Pay T.V." channels. Thus, if a channel is a "Pay T.V." channel, that portion of the perimeter of the "Pay" cam corresponding to that channel is notched. The "Pay" cam shown in FIG. 9C has only two notches, one corresponding to channel 9 and the other corresponding to channel 13 indicating that channels 9 and 13 are "Pay T.V." channels.

The relative angular positioning of the cams A through "Pay" on the shaft 902 is shown in FIG. 9C. The dotted line running through the centers of the cams in FIG. 9C represents that the cams are mechanically connected so that they are simultaneously rotatable. The maximum number of channels which may be accommodated by the shaft encoder of composite FIG. 9 is 26 and thus the cams are rotatable through 26 different angular positions. When the cams are in each of the 26 different positions, a different combination of the lever switches 908 are closed. (A switch is closed when the arch of the leaf spring 912 of the switch moves into a notch on the corresponding cam so that the plunger 910 is extended; the switch is opened when the arch of the spring 912 engages a portion of the perimeter of the corresponding cam between the notches so that the plunger 910 of the switch is depressed.) Closure of any of the switches A through D when a "word one" signal is generated by the word count decoder 60 (FIG. 2) results in the "word one" signal being applied to a corresponding OR gate 109 through 113 as shown in FIG. 8. In this manner, a different binary code signal is generated by the data bit selector 117 for each setting of the channel selector of the converter. The function of the switch 908F corresponding to the "Pay" cam will be discussed next in conjunction with the description of FIG. 10.

FIG. 10 shows a pay function circuit for use as the representative "Pay" switch in the switch set 90 of FIG. 8. The pay function circuit 122 of FIG. 10 performs the following two functions: (1) generating a signal which indicates whether the remote unit user is an authorized "Pay T.V." customer, and (2) preventing the television converter 41 from operating whenever the converter and receiver are tuned to a "Pay T.V." channel and the remote unit user is not as authorized "Pay T.V." customer.

The circuit 122 includes the cam operated switch 908F (see FIG. 9A) which is connected to a conductor interconnecting a power supply 125 (normally shown simply as part of the converter) and the converter 41. (If, as indicated earlier, a converter or similar unit were not required, then the circuit 122 would be connected to a conductor interconnecting the television receiver and a receiver power supply.) The switch 908F is also connected in series with a key operated authorization switch 133 to ground. The cathode of a diode 135 is connected to the node between the cam operated "pay" switch 908F and the switch 133 and the anode of the diode 135 is connected to one input of an AND circuit 139. This same input is also connected via a resistor 141 to a positive voltage source 143. The other input of the AND circuit 139 is connected to the "word one" output line of the decoder 60 of FIG. 2. The output of the AND circuit 139 is connected to the OR circuit 114 of FIG. 8.

As indicated earlier when discussing FIG. 9, whenever the television channel selector is "set" on a "Pay T.V." channel, the "Pay" switch 908F is closed, otherwise it is open. The setting of switch 908F together with the setting of a key operated authorization switch 133 determines whether power will be supplied from the power supply 125 to the converter 41. When a remote unit user is not an authorized "Pay T.V." customer, switch 133 is set to its closed position, e.g. by means of a key, so that when switch 908F is also closed, power from the power supply 125 is diverted from the converter 41 by way of switches 908F and 133 to ground. Thus, if a remote unit user is not an authorized "Pay T.V." customer and he tunes to a "Pay T.V." channel, his television will not operate. Of course, when the user tunes to other than a "Pay T.V." channel, switch 908F is opened so that power will not be diverted away from the converter 41 and the television will operate. Also, when the user becomes an authorized "Pay T.V." customer, switch 133 is opened (again by means of a key) so that power will not be diverted away from the converter 41 even when the user tunes to a "Pay T.V." channel.

The pay function circuit 122 is interrogated to determine if the remote unit user is an authorized "Pay T.V." customer by applying a "word 1" signal to the AND circuit 139. If switch 133 is closed, indicating that the user is not an authorized "Pay T.V." customer, the diode 135 will be forward biased and the positive voltage signal from the voltage source 143 will be applied via the diode 135 and switch 133 to ground so that the AND circuit 139 will not be enabled upon receipt of the "word 1" signal. The AND circuit 139 will thus apply a binary zero signal to the OR circuit 114 of FIG. 8 indicating that the user is not an authorized "Pay T.V." customer. If, on the other hand, switch 133 is open, indicating that the user is authorized, the diode 135 will not be forward biased and the voltage signal from the voltage source 143 together with the "word 1" signal will enable the AND circuit 139 causing it to apply a binary one signal to OR circuit 114 of FIG. 8. This indicates that the user is authorized. The output of the AND circuit 139 causes the data readout circuits 62 (FIGS. 2 and 8) to generate data signals for transmission to the master station which indicate whether the remote user is an authorized "Pay T.V." customer. These signals, together with the data signals identifying the channel to which the user is tuned, may be utilized by the master station data processors to compute billing data for that user, e.g. as a function of the time the user is tuned to a "Pay T.V." channel.

If it were desired that a remote unit user be allowed to subscribe to only certain ones but not all of the available "Pay T.V." channels, separate pay function circuits would be provided for each "Pay T.V." channel. Individual pay switches 908F would be included in each pay function circuit and the only pay switches which would be closed for any given setting of the channel selector would be the one corresponding to the "Pay T.V." channel to which the television receiver was tuned. Each such pay switch would thus be closed at only one setting of the channel selector. The switch 133 would be opened in each pay function circuit corresponding to a "Pay T.V." channel which the user was authorized to watch. Each pay function circuit would be connected to the conductor interconnecting the converter power supply 125 and the converter 41 just as shown in FIG. 10. The output of each pay function circuit would be connected to the OR circuit 114 of FIG. 8.

While there has been described what is considered to be a good, practical working example of this invention, it is to be clearly understood that various changes and modifications may be readily made therein without departing from the invention. For example, more than the three $f_1$, $f_2$ and $f_3$ interrogation and control signals could, if desired, be utilized for interrogation and control purposes. Furthermore, the values of the frequencies used may be any of a large variety of values. As already indicated, such signals may be any three frequencies which can be detected as fundamental frequencies or, if desired, can be heterodyned signals obtained by mixing three fundamental frequencies with a common carrier or sub-carrier frequency. Also, if desired, frequency shift keying can be employed. The primary criteria is to employ distinctive interrogation and control signals which can be transmitted in a simultaneous and independent manner and which can be subsequently separated and individually reproduced at each of the remote units.

It should be further noted that the signal formats set forth in FIGS. 3 and 4 are good typical working examples, but are not to be taken as all inclusive of the formats that can be used with the present invention. Similar considerations apply to the waveforms of FIG. 5. In particular, the format shown in FIG. 5 may be readily expanded to include an additional number of identification code bits in interval III, an additional number of function selector bits in interval IV; or an additional number of data bits in readout interval V. If desired, parity signals can be added to either the identification code signals transmitted by the master station or to the data reply signals transmitted by the remote unit. In the latter case, one of the bits 1 through 16 might be used for parity purposes. Alternatively, one or more additional bits may be added to the reply data for parity purposes.

With respect to the function selector or word count decoder 60 of FIG. 6, the four-bit counter 63 and the four-line to 16-line decoder 64 can be expanded to form an X-bit counter and an X-bit to Y-bit decoder, where X and Y may be assigned the desired values. With respect to the ID decoder 61 shown in FIG. 7, the shift register 68 and the decoders 71, 72 and 73 may be expanded to accommodate a greater number of identification code bits. Also, the output AND gate 81 may be expanded to have a larger number of input lines in the event the increased number of identification code bits should require same.

With respect to FIG. 8, the various mechanical switches thereshown (switches in units 89, 90 and 92) are intended by way of example only. Such switches may instead take the form of various known types of electronic switch circuits and logic circuits, such as those which employ transistors or semi-conductor switching devices. In other words, any form of data transducer device of circuit can be employed which enables the recognition of the desired binary zero and binary one conditions. Also, with respect to FIG. 8, the data bit selector 117 and the number of OR gates 101–116 are expandable to accommodate a greater number of data bits in the reply signal.

With respect to FIGS. 9A through 9C, the shaft decoder thereshown is only illustrative of the mechanisms which may be utilized to determine the setting of a channel selector. If a pushbutton, rather than a rotary, selector were employed, switches could be ganged to each pushbutton mechanism to generate an indication of the channel selector setting.

While there have been described what are at present considered to be preferred embodiments of this invention, it will be obvious to those skilled in the art that various further changes and modifications may be made therein without departing from the invention, and it is, therefore, intended to cover all such changes and modifications as fall within the true spirit and scope of the invention.

What is claimed is:

1. A television communications system having a plurality of television channels some of which are pay television channels comprising:

a master station, a plurality of remote subscriber units and a cable network for coupling the remote subscriber units to the master station wherein:

the master station comprises:

television signal transmitter means for transmitting television signals over said channels in a first frequency range;

interrogation signal transmitter means for transmitting interrogation signals in a second frequency range;

and receiver means for receiving reply signals in a third frequency range;

and each remote subscriber unit comprises:

television receiver means responsive to the transmitted television signals for reproducing television programs at the remote unit location, said television receiver means including channel selector means for selecting the television channel to which the television receiver means is tuned;

reply signal transmitter means for transmitting reply signals back to the master station in the third frequency range;

data transducer means coupled to the television receiver channel selector means and responsive to a predetermined signal pattern in the received master station interrogation signals for producing indications of the channel to which the television receiver means is tuned at any given instant, said data transducer means including apparatus for producing an authorization indication of whether the remote subscriber unit is an authorized pay television channel user;

and control circuit means responsive to the data transducer means for controlling the operation of the reply signal transmitter means to transmit signals representing the channel to which the television receiver means is tuned back to the master station, said control circuit means including means for controlling the reply signal transmitter means to transmit signals back to the master station representing the authorization indication.

2. A television communications system in accordance with claim 1 wherein said authorization indication producing apparatus includes a manually operable switch having first and second conditions, said first condition indicating that the remote unit is an authorized pay television channel user and said second condition indicating the remote unit is not an authorized pay television channel user, and means for generating a first signal when said switch is in the first condition and for generating a second signal when said switch is in the second condition.

3. A television communications system in accordance with claim 2 wherein said first and second signal generating means includes a voltage source connected to one side of said switch, the other side of said switch being connected to ground, said switch conducting electrical current from said voltage source to ground when in the second condition and preventing the conduction of current from said voltage source to ground when in the first condition, and means connected to the node interconnecting said voltage source and said switch and responsive to a predetermined signal pattern in the received master station interrogation signals for generating said first signal when said switch is in the first condition and for generating a second signal when said switch is in the second condition.

4. A television communications system in accordance with claim 2 further including means responsive to said television receiver channel selector means for preventing the operation of said television receiver means when said switch is in the first condition and said channel selector means is tuned to a certain pay television channel and for enabling the operation of said television receiver means when said channel selector means is tuned to other than a pay television channel.

5. A television communications system in accordance with claim 4 further including power supply means and an electrical conductor connecting said supply means to said television receiver means, and wherein said preventing and enabling means includes a second switch responsive to said channel selector means for assuming a conductive condition when said channel selector means is tuned to a certain pay television channel and for assuming a non-conductive condition when said channel selector means is tuned to other than a pay television channel, said second switch and said manually operable switch being connected in series to interconnect said conductor with ground, said second switch and said manually operable switch conducting power from said power supply to ground when said second switch is in the conductive condition and said manually operable switch is in the second condition to thereby prevent the operation of said television receiver means.

6. A television communications system in accordance with claim 1 wherein:

the television receiver channel selector means is a rotary-type selector including a tuner shaft;

and the data transducer means includes a shaft encoder comprising a cam shaft coupled to the tuner shaft to rotate as the tuner shaft is rotated, a plurality of cams mounted on the cam shaft so that the cams rotate about their axis as the cam shaft is rotated, said cams each having a different pattern of notches located about the perimeter thereof, and a plurality of switches each positioned adjacent the perimeter of a different and corresponding one of said cams and each operable by its corresponding cam to close and thereby generate a signal when the switch is adjacent to a notch in the cam, said switches thereby generating a digital signal pattern for each setting of the tuner shaft.

7. A communication system comprising:

a master station including transmitter means for transmitting interrogation signals which include identification code signals, function selector code signals and data readout control signals, and receiver means for receiving reply signals;

and a remote unit comprising:

receiver means for receiving interrogation signals transmitted by the master station;

transmitter means for transmitting reply signals back to the master station;

television receiver means for reproducing television programs at the remote unit location and including channel selector means for selecting the television channel to be viewed;

function selector decoder means responsive to a particular function selector code signal for generating an enable signal;

transducer means coupled to said television receiver channel selector means and responsive to said enable signal for generating data signals identifying the channel to which said channel selector means is set, said transducer means including pay function means comprising a manually operable switch having first and second conditions, said pay function means being responsive to said enable signal for generating a first data signal when said switch is in said first condition and for generating a second data signal when said switch is in said second condition, and means for applying said first and second data signals to said remote unit transmitter means;

means for applying said data signals to said remote unit transmitter means;

and indentification decoder means responsive to a particular identification code signal for enabling the remote unit transmitter means to transmit data signals to the master station.

8. A communications system in accordance with claim 7 wherein said transducer means further includes means coupled to said television receiver channel selector means for inhibiting said television receiver from reproducing television programs when said switch is in said first condition and said channel selector means is set to certain channels.

9. A communications system in accordance with claim 8 wherein said transducer means further includes means responsive to said enable signal for generating a third data signal when said television receiver means is reproducing television programs.

* * * * *

UNITED STATES PATENT OFFICE

CERTIFICATE OF CORRECTION

Patent No. 3,794,922 Dated February 26, 1974

Inventor(s) William Osborn et al

It is certified that error appears in the above-identified patent and that said Letters Patent are hereby corrected as shown below:

Column 2, line 61, delete "of" and insert --or--

Column 7, line 9, delete "85" and insert --75--

Column 7, line 35, delete "specifid" and insert --specific--

Column 8, line 1 delete "AT" and insert --at--

Signed and sealed this 18th day of June 1974.

(SEAL)
Attest:

EDWARD M.FLETCHER,JR.
Attesting Officer

C. MARSHALL DANN
Commissioner of Patents